(12) United States Patent (10) Patent No.: US 7,698,449 B1
Keller et al. (45) Date of Patent: Apr. 13, 2010

(54) METHOD AND APPARATUS FOR CONFIGURING A PROCESSOR EMBEDDED IN AN INTEGRATED CIRCUIT FOR USE AS A LOGIC ELEMENT

(75) Inventors: Eric R. Keller, Boulder, CO (US);
Philip B. James-Roxby, Longmont, CO (US)

(73) Assignee: XILINX, Inc., San Jose, CA (US)

( * ) Notice: Subject to any disclaimer, the term of this patent is extended or adjusted under 35 U.S.C. 154(b) by 962 days.

(21) Appl. No.: 11/064,148

(22) Filed: Feb. 23, 2005

(51) Int. Cl.
*G06F 15/163* (2006.01)

(52) U.S. Cl. ...................... 709/231; 712/241
(58) Field of Classification Search .................. 709/231; 712/241
See application file for complete search history.

(56) References Cited

U.S. PATENT DOCUMENTS 5,652,904 A 7/1997 Trimberger
5,956,518 A * 9/1999 DeHon et al. .................. 712/15
6,476,634 B1 11/2002 Bilski

OTHER PUBLICATIONS

MicroBlaze Processor Reference Guide, EDK (v6.2) Jun. 14, 2004, Xilinx.*

Xilinx, Inc.; U.S. Appl. No. 11/019,783, by Simkins et al. filed Dec. 21, 2004.
U.S. Appl. No. 10/229,543, filed Aug. 27, 2002, Ganesan et al.
U.S. Appl. No. 10/377,855, filed Feb. 28, 2003, Bilski.
U.S. Appl. No. 10/402,659, filed Mar. 28, 2003, James-Roxby et al.
Xilinx Inc., "Connecting Customized IP to the MicroBlaze Soft Processor Using the Fast Simplex Link (FSL) Channel", XAPP529, May 12, 2004, pp. 1-12, available from Xilinx, Inc., 2100 Logic Drive, San Jose, CA 95124.
Xilinx, Inc., "MicroBlaze™ Hardware Reference Guide", Mar. 2002, pp. 1-222, available from Xilinx, Inc., 2100 Logic Drive, San Jose, CA 95124.
Xilinx Datasheet, "Fast Simplex Link (FSL) Bus (v2.00a)", DS449, Dec. 1, 2005, Product Specification, 1-8 pages, Xilinx, Inc.; 2100 Logic Drive, San Jose, CA.

* cited by examiner

*Primary Examiner*—William M Treat
(74) *Attorney, Agent, or Firm*—Robert M. Brush

(57) ABSTRACT

Method and apparatus for configuring a processor embedded in an integrated circuit for use as a logic element is described. In one example, a processing apparatus in an integrated circuit includes a point-to-point data streaming interface and arithmetic logic unit (ALU) circuitry. The ALU circuitry includes at least one input port in communication with the point-to-point data streaming interface. The processor may also include a register file and multiplexer logic. The multiplexer logic is configured to selectively couple the register file and the point-to-point streaming interface to the at least one input port of the ALU circuitry.

18 Claims, 3 Drawing Sheets

METHOD AND APPARATUS FOR CONFIGURING A PROCESSOR EMBEDDED IN AN INTEGRATED CIRCUIT FOR USE AS A LOGIC ELEMENT

FIELD OF THE INVENTION

One or more aspects of the present invention relate generally to microprocessors and, more particularly, to a method and apparatus for configuring a processor embedded in an integrated circuit for use as a logic element.

BACKGROUND OF THE INVENTION

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes an array of configurable logic blocks (CLBs) surrounded by a ring of programmable input/output blocks (IOBs). The CLBs and IOBs are interconnected by a programmable interconnect structure. The CLBs, IOBs, and interconnect structure are typically programmed by loading a stream of configuration data (known as a bitstream) into internal configuration memory cells that define how the CLBs, IOBs, and interconnect structure are configured. An FPGA may also include various dedicated logic circuits, such as memories, microprocessors, digital clock managers (DCMs), and input/output (I/O) transceivers.

Notably, an FPGA having embedded processor or controller circuitry is referred to as a system-on-chip (SoC). An SoC is a fully functional product having its electronic circuitry contained on a single chip. An SoC typically includes all the required ancillary hardware components to facilitate operation of the embedded processor or controller circuitry. For example, an SoC for a cellular telephone may include a microprocessor, an encoder, a decoder, a digital signal processor (DSP), random access memory (RAM), read only memory (ROM), and the like.

An embedded processor is conventionally used as a central processing unit configured to sequentially process instructions contained in software program code (i.e., the conventional fetch, read, execute, write cycle). In some cases, however, it is desirable to use the processor as a logic element. For example, it may be desirable to use an embedded processor in an FPGA to implement a state machine. Since a conventional embedded processor is designed with a software-centric view of a system, it does not provide for efficient implementation of logic elements. For example, if a conventional embedded processor is used to implement a state machine, driving the input/output interface of the processor takes a large percentage of the processing time, which deleteriously affects performance.

Accordingly, there exists a need in the art for a method and apparatus for configuring a processor embedded in an integrated circuit for use as a logic element.

SUMMARY OF THE INVENTION

Method and apparatus for configuring a processor embedded in an integrated circuit for use as a logic element is described. In one embodiment, a processing apparatus in an integrated circuit includes a point-to-point data streaming interface and arithmetic logic unit (ALU) circuitry. The ALU circuitry includes at least one input port in communication with the point-to-point data streaming interface. The processor may also include a register file and multiplexer logic. The multiplexer logic is configured to selectively couple the register file and the point-to-point streaming interface to the at least one input port of the ALU circuitry.

In another embodiment, a processing apparatus includes a program counter, ALU circuitry, and multiplexer logic. The program counter is configured to store a first pointer to a next instruction to be executed in a program. The ALU circuitry includes branch logic for processing instructions from the program. Each of the instructions includes a branch field. The branch field of at least one of the instructions includes a second pointer to the next instruction in the program to be executed. The multiplexer logic provides the second pointer to the program counter.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Method and apparatus for configuring a processor embedded in an integrated circuit for use as a logic element is described. One or more aspects of the invention are described with respect to an FPGA. Those skilled in the art will appreciate that the present invention may be used with other types of programmable logic devices, such as complex programmable logic devices (CPLDs).

Figure 1:
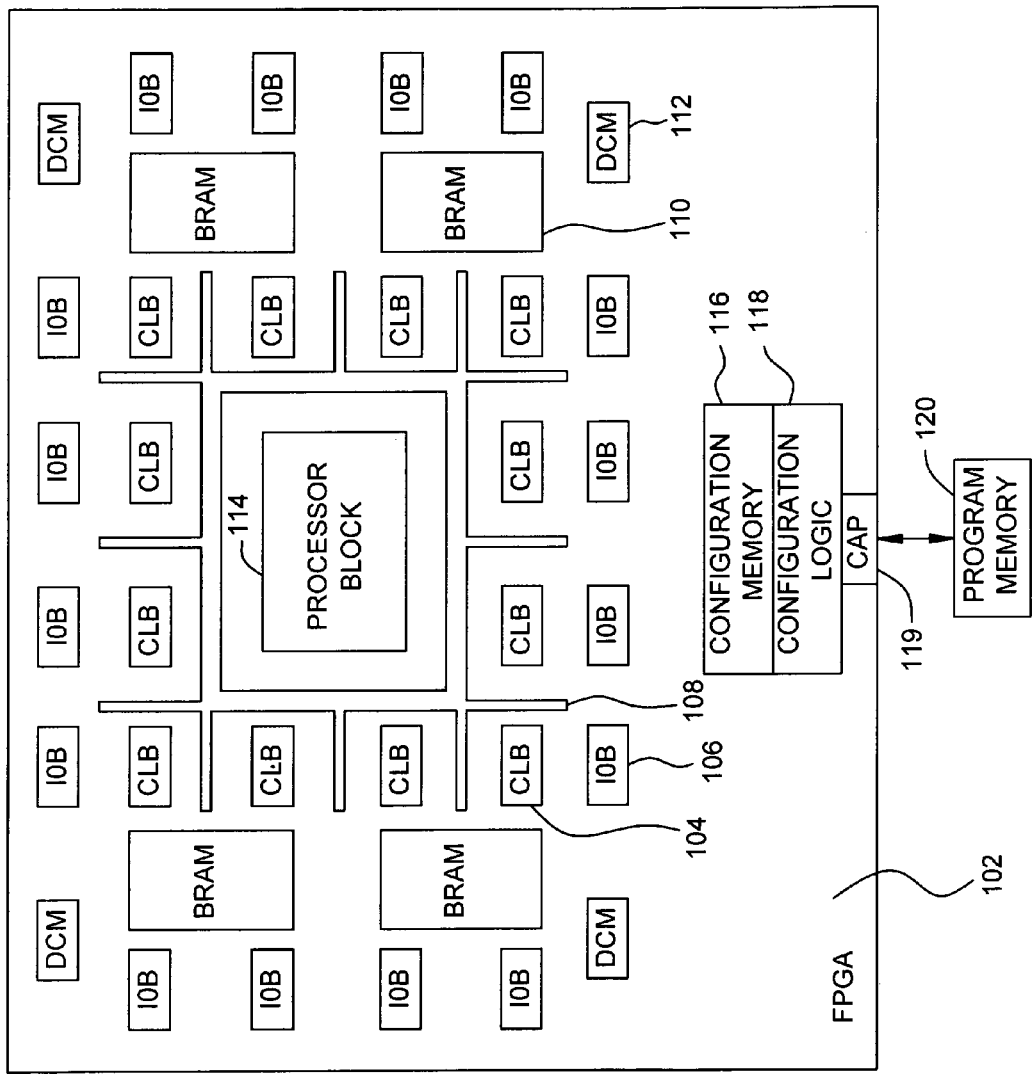
FIG. 1 is a block diagram depicting an exemplary embodiment of an FPGA coupled to a program memory.

FIG. 1 is a block diagram depicting an exemplary embodiment of an FPGA 102 coupled to a program memory 120. The FPGA 102 illustratively comprises programmable logic circuits or "blocks", illustratively shown as CLBs 104, IOBs 106, and programmable interconnect 108 (also referred to as "programmable logic"), as well as configuration memory 116 for determining the functionality of the FPGA 102. The FPGA 102 may also include an embedded processor block 114, as well as various dedicated internal logic circuits, illustratively shown as blocks of random access memory ("BRAM 110"), configuration logic 118, and digital clock management (DCM) blocks 112. Those skilled in the art will appreciate that the FPGA 102 may include other types of logic blocks and circuits in addition to those described herein.

As is well known in the art, the IOBs 106, the CLBs 104, and the programmable interconnect 108 may be configured to perform a variety of functions. Notably, the CLBs 104 are programmably connectable to each other, and to the IOBs 106, via the programmable interconnect 108. Each of the CLBs 104 may include one or more "slices" and programmable interconnect circuitry (not shown). Each CLB slice in turn includes various circuits, such as flip-flops, function generators (e.g., a look-up tables (LUTs)), logic gates, memory, and like type well-known circuits. The IOBs 106 are configured to provide input to, and receive output from, the CLBs 104.

Configuration information for the CLBs 104, the IOBs 106, and the programmable interconnect 108 is stored in the configuration memory 116. The configuration memory 116 may include static random access memory (SRAM) cells. The configuration logic 118 provides an interface to, and controls configuration of, the configuration memory 116. A configuration bitstream produced from the program memory 120 may be coupled to the configuration logic 118 through a configuration port 119. The configuration process of FPGA 102 is also well known in the art.

The DCM blocks 112 provide well-known clock management circuits for managing clock signals within the FPGA 102, such as delay lock loop (DLL) circuits and multiply/divide/de-skew clock circuits. The processor block 114 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic of the FPGA 102 (e.g., CLBs 104, IOBs 106). For example, a MICROBLAZE soft microprocessor, available from Xilinx of San Jose, Calif., may be employed. A hard microprocessor may be implemented using an IBM POWER PC, Intel PENTIUM, AMD ATHLON, or like type processor core known in the art.

The processor block 114 is coupled to the programmable logic of the FPGA 102 in a well known manner. For purposes of clarity by example, the FPGA 102 is illustrated with 12 CLBs, 16 IOBs, 4 BRAMs, 4 DCMs, and one processor block. Those skilled in the art will appreciate that actual FPGAs may include one or more of such components in any number of different ratios. For example, the FPGA 102 may be selected from the VIRTEX-4 family of products, commercially available from Xilinx, Inc. of San Jose, Calif.

Figure 2:
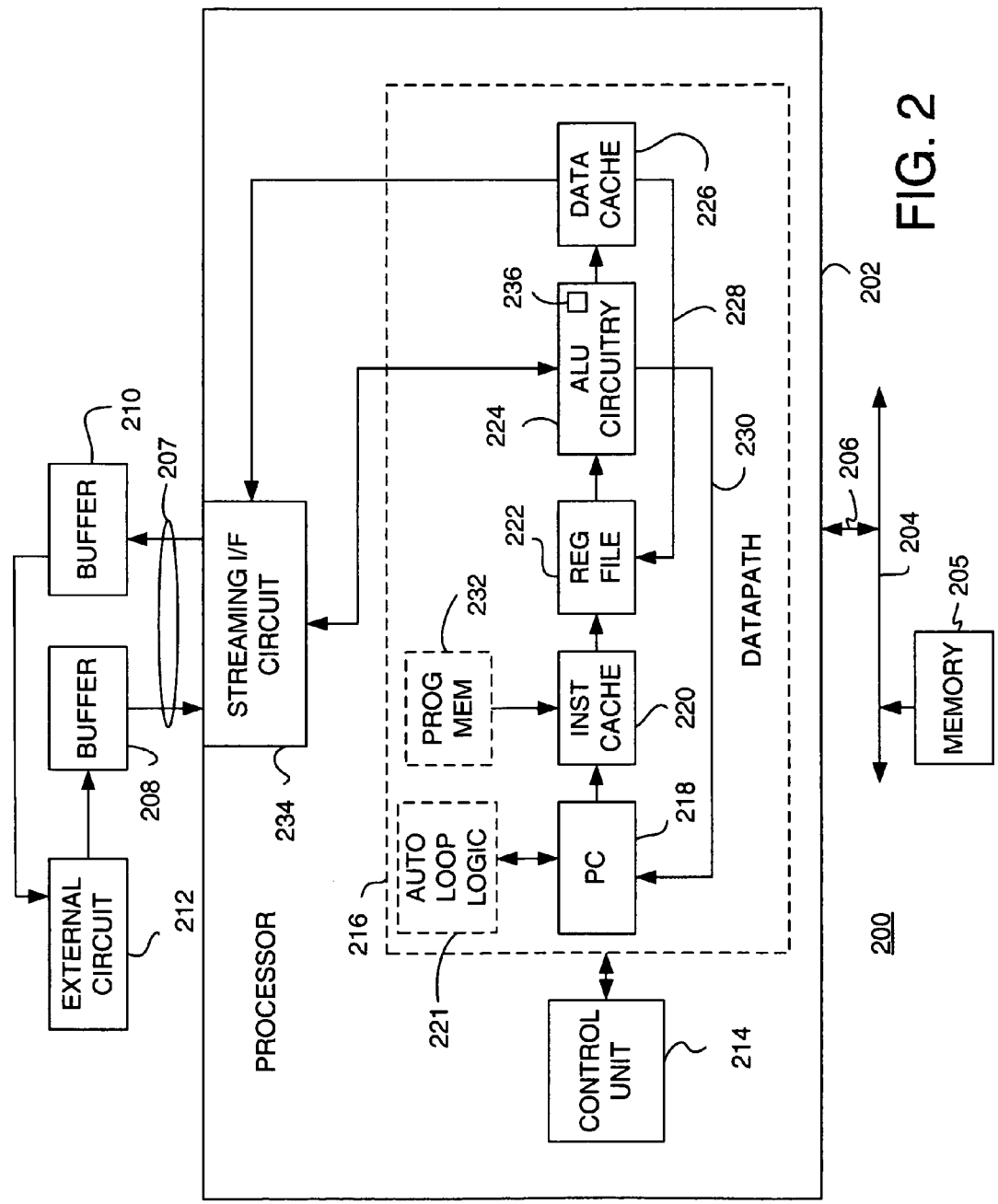
FIG. 2 is a high-level block diagram depicting an exemplary embodiment of processing circuitry constructed in accordance with the invention.

FIG. 2 is a high-level block diagram depicting an exemplary embodiment of processing circuitry 200 constructed in accordance with an embodiment of the invention. The processing circuitry 200 may be implemented using the FPGA 100 of FIG. 1. The processing circuitry 200 includes a processor 202, for example, an embedded microprocessor in the FPGA 100, a main bus 204, a buffer 208, a buffer 210, and an external circuit 212. The processor 202 is configured for use a logic element and may be in communication with the external circuit 212 through the buffer 208 and the buffer 210. For example, the processor 202 may be configured to implement a state machine, where each state is represented by a series of instructions and a branch. Alternatively, the processor 202 may be configured to perform a fixed series of operations continuously in a conditional (or unconditional) loop (e.g., perform an addition operation every cycle until a condition is met). Using the processor 202 as a logic element saves resources in the FPGA 100, which may be used to implement other circuits (e.g., the external circuit 212).

The processor 202 includes a bus interface 206 and a streaming interface 207. The bus interface 206 is configured for communication with the main bus 204. The streaming interface 207 is configured for communication with the buffer 208 and the buffer 210. In particular, the streaming interface 207 is configured to provide a unidirectional, point-to-point streaming interface between each of the buffers 208 and 210 and the processor 202. The streaming interface 207 provides data from the processor 202 to the buffer 210, and receives data to the processor 202 from the buffer 208.

The buffers 208 and 210 provide an interface to the processor 202 for the external circuit 212. Notably, the processor 202 may be configured as a logic element that transmits data to, and receives data from, the external circuit 212 using the buffer 210 and the buffer 208, respectively. The buffers 208 and 210, as well as the external circuit 212, may be implemented using programmable logic in the FPGA 100. For example, the processor 202 may be a MICROBLAZE soft processor, the bus interface 206 may be an on-chip peripheral bus (OPB), and the streaming interface 207 may be a fast simplex link (FSL) interface.

The processor 202 includes a control unit 214, a datapath 216, and a streaming interface (I/F) circuit 234. In one embodiment, the datapath 216 includes a program counter (PC) 218, an instruction (inst) cache 220, a register (reg) file 222, arithmetic logic unit (ALU) circuitry 224, and a data cache 226. The instruction cache 220 stores one or more instructions of a program for execution by the processor 202. In one embodiment, the program is stored in a memory 205 coupled to the main bus 204 and the instruction cache 220 receives instructions from the memory 205. In another embodiment, the instruction cache 220 receives instructions from a program memory (prog mem) 232 disposed within the processor 202.

Notably, using the processor 202 as a logic element saves logic resources in the FPGA 100 for use by other circuitry (e.g., the external circuit 212). If the programmable fabric of the FPGA 100 is used to store instructions (e.g., a BRAM), then the advantage of using the processor 202 as a logic element to save resources is diminished. Thus, in one embodiment, the processor 202 includes the program memory 232 for storing the set of instructions comprising a program. The program memory 232 may comprise random access memory (RAM) and like type read/write memories. Providing the program memory 232 in the processor 202 obviates the need to store the instructions using the programmable fabric of the FPGA 100. In one embodiment, the program memory 232 is modifiable using the configuration bitstream loaded into the FPGA 100.

The program counter 218 controls which of the instructions in the program is to be executed next (i.e., the program counter 218 holds the address of the memory location that contains the next instruction to be executed). An output interface of the program counter 218 is in communication with the instruction cache 220 for selecting the next instruction for execution. The register file 222 includes locally accessible registers, such as an instruction register, indexing register(s), counting register(s), addressing register(s), stack pointer register(s), a flags register, and like type processor registers known in the art. An interface of the register file 222 is in communication with the instruction cache 220 for receiving instructions.

The ALU circuitry 224 includes one or more ALUs. As is well known in the art, an ALU performs arithmetic/logical transformations in response to input data and instructions. One interface of the ALU circuitry 224 is in communication with the register file 222, which allows the ALU circuitry 224 to perform operations on information stored therein, as is well known in the art. Another interface of the ALU circuitry 224 is in communication with the streaming interface circuit 234.

The streaming interface circuit 234 provides a port or ports for communicating data between the streaming interface 207 and the ALU circuitry 224. This allows data to be directly coupled to the ALU circuitry 224 from the streaming interface 207. For example, data stored in the buffer 208 may be directly coupled to the ALU circuitry 224. Directly coupling data to the ALU circuitry 224 from the streaming interface 207 saves processing cycles compared to the process of loading data into the register file 222 and then coupling the data to the ALU circuitry 224 (i.e., input overhead is reduced).

The ALU circuitry 224 provides result data to the data cache 226. The result data may be written back to the register file 222 via the path 228 between the data cache 226 and the register file 222. In addition, the result data may be output directly via the streaming interface circuit 234. For example, result data stored in the data cache 226 or obtained directly from the ALU circuitry 224 may be output to the buffer 210. Directly providing the result data via the streaming interface 207 saves processing cycles compared to the process of writing data back to the register file 222 and then reading the data from the register file (i.e., output overhead is reduced).

The ALU circuitry 224 may include an ALU for processing branch instructions. "Branch instructions" are instructions configured to cause the program counter to jump to another instruction in the program, which may not necessarily be the next instruction. Branch instructions typically follow compare instructions (e.g., if-else type constructs). In one embodiment of the invention, an instruction may include a branch field. For example, the branch field may include a pointer to the next instruction to be executed in the program. Alternatively, the branch field may include multiple pointers to next instructions predicated upon a result of the instruction. For example, a comparison instruction may include a branch field that dictates two different branches based on the value of the compare operation. The ALU circuitry 224 includes branch logic 236 for handling the branch field of an instruction and producing a pointer to be loaded into the program counter 218 via a path 230 between the ALU circuitry 224 and the program counter 218. Incorporating the branch logic 236 into the ALU circuitry 224 allows two operations (e.g., a compare and a branch) to be combined into a single instruction, thereby reducing instruction overhead.

The datapath 216 may also include automatic loop logic 221. The automatic loop logic 221 compares the value in the program counter 218 to the program length (i.e., a pointer to the last instruction of the program). The program length may be stored in a register within the automatic loop logic 221 via the configuration bitstream of the FPGA. If the value in the program counter 218 is equal to the program length, the automatic loop logic 221 resets the program counter 218 to the start of the program. The automatic loop logic 221 is useful if the processor 202 is being configured to execute continuous loop of instructions. If eight operations are to be done in a loop, for example, an explicit branch instruction to restart the loop would add 12.5% overhead. By employing the automatic loop logic 221, such instruction overhead is saved, since no explicit branch instruction would be required to restart the program.

The control unit 214 provides control signals to the datapath 216. In particular, the control unit 214 provides control signals to the datapath 216 based on the instruction to be executed. For example, the control unit 214 decodes operation of an instruction read from the instruction cache 220 and controls the operation performed by the ALU circuitry 224.

Figure 3:
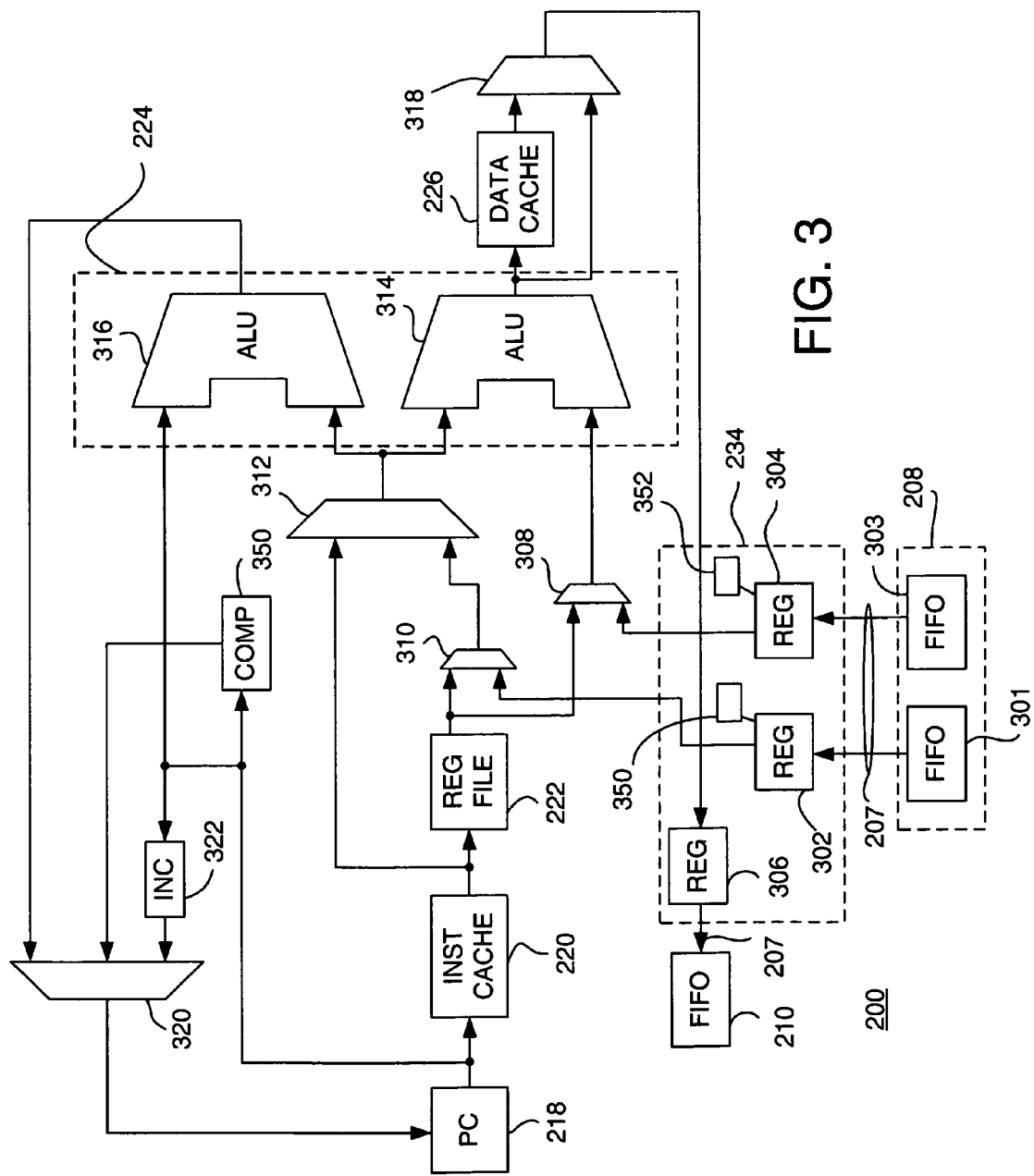
FIG. 3 is a more detailed block diagram depicting an exemplary embodiment of the processing circuitry of FIG. 2 constructed in accordance with the invention.

FIG. 3 is a more detailed block diagram depicting an exemplary embodiment of the processing circuitry 200 of FIG. 2 constructed in accordance with the invention. Elements of FIG. 3 that are the same or similar to those of FIG. 2 are designated with identical reference numerals and are described in detail above. In one embodiment, the processor 202 further includes multiplexers 308, 310, 312, 318, and 320, an increment circuit 322, and registers 302, 304, and 306. The ALU circuitry 224 includes an ALU 314 and an ALU 316. The buffer 208 includes a first-in-first out circuit (FIFO) 301 and a FIFO 303. The buffer 210 may be implemented using a FIFO.

A first input terminal of the ALU 314 is coupled to an output terminal of the multiplexer 308. A second input terminal of the ALU 314 is coupled to an output terminal of the multiplexer 312. An output terminal of the ALU 314 is coupled to the data cache 226 and a first input terminal of the multiplexer 318. A first input terminal of the ALU 316 is coupled to the output terminal of the multiplexer 312. A second input terminal of the ALU 316 is coupled to an output terminal of the program counter 218. An output terminal of the ALU 316 is coupled to a first input terminal of the multiplexer 320.

A first input terminal of the multiplexer 308 is coupled to an output terminal of the register file 222, and a second input terminal of the multiplexer 308 is coupled to the register 304. A first input of the multiplexer 312 is coupled to an output terminal of the multiplexer 310, and a second input terminal of the multiplexer 312 is coupled to an output terminal of the instruction cache 220. A first input terminal of the multiplexer 310 is coupled to an output terminal of the register file 222, and a second input terminal of the multiplexer 310 is coupled to the register 302. A second input terminal of the multiplexer 318 is coupled to an output terminal of the data cache 226. An output terminal of the multiplexer 318 is coupled to the register 306.

A second input terminal of the multiplexer 320 is coupled to the output terminal of the instruction cache 220, and a third input terminal of the multiplexer 320 is coupled to an output terminal of the increment circuit 322. An output terminal of the multiplexer 320 is coupled to an input terminal of the program counter 218. An input terminal of the increment circuit 322 is coupled to the output terminal of the program counter 218.

In operation, the registers 302 and 304 provide an input streaming interface to the ALU circuitry 224. Notably, the multiplexer 308 selects between data from the register file 222 and data from the register 304 as input to the ALU 314. The multiplexer 310 selects between data from the register file 222 and data from the register 302 as input to the multiplexer 312. The multiplexer 312 selects between data from the instruction cache 220 and data from the multiplexer 310 as inputs to the ALU 314 and the ALU 316. Thus, the multiplexers 308, 310, and 312 may be configured to: 1) couple data from the register 304 to the ALU 314; 2) couple data from the register 302 to either the ALU 314 or the ALU 316; or 3) both of 1) and 2). Control of the multiplexers 308, 310, and 312 is provided by the control unit 214 (shown in FIG. 2) in accordance with instruction data.

The register 306 provides an output streaming interface from the data cache 226 or the ALU 314. The multiplexer 318 selects between output from the data cache 226 and output from the ALU 314. Control of the multiplexer 318 is provided by the control unit 214 (shown in FIG. 2) in accordance with instruction data. By providing paths between the registers 302, 304, and 306, and the ALUs 314 and 316, the invention reduces input/output overhead. For example, the following instruction may be performed in a single cycle: Add FSL1, FSL2, FSL3 (i.e., FSL3=FSL1+FSL2), where FSL1 corresponds to the register 302, FSL2 corresponds to the register 304, and FSL3 corresponds to the register 306.

In general, input data is loaded into at least one register via the point-to-point streaming interface 207 (e.g., at least one of the registers 301 and 303). The processor 202 receives an instruction from a program. In response to the instruction, the ALU circuitry 224 reads the input data from the registers and provides output data to at least one output register (e.g., the register 306). The output data is transmitted from the output register(s) over the point-to-point streaming interface 207.

In one embodiment, each time one of the ALUs 314 and 316 reads data from one of the registers 302 and 304, the read operation causes a new value to be loaded from the FIFO 301 and the FIFO 303, respectively. In other words, when an element is dequeued from a FIFO, the next element is prefetched to its respective register. If on enqueue of a FIFO the FIFO is empty, then the value is stored to its respective register. In this manner, the streaming interface 207 may be directly coupled to the ALU circuitry 314.

In another embodiment, a read operation does not necessarily cause a new value to be loaded to the registers 302 and 304. For example, it may be desirable to perform different operations on the same value. Thus, in one embodiment, the instruction causing the read operation from a register or registers includes a bit or bits that indicate whether or not the current value should be replaced with the next value. For example, the add instruction above may include flags indicating whether or not the values read from FSL1 and FSL2 should be replaced with the next values.

In yet another embodiment, the processor 202 includes a shadow register 350 associated with the register 302 and a shadow register 353 associated with the register 304. When the register 302 is loaded with a value from the FIFO 301, the shadow register 350 is loaded with the same value. Likewise, when the register 304 is loaded with a value from the FIFO 303, the shadow register 352 is loaded with that same value. An instruction causing a read operation from one of the registers 302 and 304 may include a bit or bits that indicate whether to read from an actual one of the registers 302 and 304, or from the corresponding one of the shadow registers 350 and 352. A read operation from one of the shadow registers 350 or 352 does not cause a new value to be loaded into the corresponding one of the registers 302 or 304.

The multiplexer 320 selects between output from the ALU 316, output from the instruction cache 220, and output of the increment circuit 322. Control of the multiplexers 320 is provided by the control unit 214 (shown in FIG. 2) in accordance with instruction data. The increment circuit 322 provides a pointer to the next instruction in the program. The ALU 316 provides a pointer to an instruction in accordance with a branch operation. In one embodiment, the processor 202 includes a compare block 350 for providing automatic loop control. The compare block 350 compares the value in the program counter 218 to the program length (i.e., a pointer to a last instruction in said program). The program length may be stored in the compare block 350 via the configuration bitstream of the FPGA. If the value in the program counter 218 is equal to the program length, the compare block 350 provides a pointer to the start of the program.

Method and apparatus for configuring a processor embedded in an integrated circuit for use as a logic element has been described. In one embodiment, input/output overhead is reduced by providing a direct path to ALU circuitry in the processor via a point-to-point streaming interface. In another embodiment, a program memory is included within the processor for storing a set of instructions that is to be continuously executed in a loop, thereby freeing resources in the integrated circuit to be used by other circuitry. In another embodiment, automatic loop circuitry provides for automatic looping in a program, obviating the need for an explicit branch instruction and thereby reducing branch overhead. In yet another embodiment, any combination of the aforementioned embodiments may be combined.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

We claim:

1. A processing apparatus in an integrated circuit, comprising:
   a point-to-point data streaming interface;
   a first arithmetic logic unit (ALU) circuitry having at least one input port;
   a second ALU circuitry having at least one input port, wherein said second ALU circuitry processes branches;
   a register file; and
   multiplexer logic configured to selectively couple said register file and said point-to-point data streaming interface to said at least one input port of said first ALU circuitry and said at least one input port of said second ALU circuitry.

2. The apparatus of claim 1, further comprising:
   a streaming interface circuit having at least one register in respective communication with said at least one input port of said first ALU circuitry.

3. The apparatus of claim 2, further comprising:
   at least one first-in-first-out circuit (FIFO) in respective communication with said at least one register.

4. The apparatus of claim 3, wherein said first ALU circuitry is configured to read data from said at least one register in response to an instruction, and wherein new data is automatically loaded into said at least one register from said at least one FIFO.

5. The apparatus of claim 3, wherein said first ALU circuitry is configured to read data from said at least one register in response to an instruction, and wherein new data is loaded into said at least one register in response to state of at least one bit in said instruction.

6. The apparatus of claim 2, wherein said streaming interface circuit further comprises:
   at least one shadow register respectively coupled to said at least one register.

7. The apparatus of claim 1, further comprising:
   an instruction cache; and
   a program memory, in communication with said instruction cache, for storing a set of instructions comprising a program.

8. The apparatus of claim 1, further comprising:
   a program counter for storing a pointer to a next instruction to be executed in a program; and
   automatic loop circuitry for comparing said pointer to a length of said program and for automatically resetting said program counter in response to said pointer equaling said length.

9. The apparatus of claim 1, wherein said first ALU circuitry comprises branch logic for processing instructions from a program having a branch field, said branch field including a pointer to a next instruction in said program to be executed.

10. The apparatus of claim 1, wherein said point-to-point data streaming interface and said first ALU circuitry is disposed within a processor embedded within said integrated circuit.

11. The apparatus of claim 1, wherein said integrated circuit comprises a field programmable gate array (FPGA).

12. A processing apparatus in an integrated circuit, comprising:
- a point-to-point data streaming interface;
- a program counter for storing a first pointer to a next instruction to be executed in a program;
- a first arithmetic logic unit (ALU) circuitry having branch logic for processing instructions from said program, each of said instructions having a branch field, said branch field of at least one of said instructions including a second pointer to said next instruction in said program to be executed, wherein said first ALU circuitry has at least one input port;
- a second ALU circuitry having at least one input port;
- a register file;
- first multiplexer logic for selectively providing said second pointer to said program counter; and
- second multiplexer logic configured to selectively couple said register file and said point-to-point data streaming interface to said at least one input port of said first ALU circuitry and said at least one input port of said second ALU circuitry.

13. The apparatus of claim 12, further comprising:
a streaming interface circuit having at least one register in respective communication with said at least one input port of said first ALU circuitry.

14. The apparatus of claim 13, further comprising:
at least one first-in-first-out circuit (FIFO) in respective communication with said at least one register.

15. The apparatus of claim 12, further comprising:
an instruction cache; and
a program memory, in communication with said instruction cache, for storing a
set of instructions comprising a program.

16. The apparatus of claim 12, further comprising:
automatic loop circuitry for comparing said first pointer to a length of said program and for automatically resetting said program counter in response to said first pointer equaling said length.

17. The apparatus of claim 12, wherein said program counter, said first ALU circuitry, and said first multiplexer logic are disposed within a processor embedded within said integrated circuit.

18. In a processing block in an integrated circuit, a method, comprising:
- loading input data to at least one first register via a point-to-point streaming interface;
- receiving an instruction from a program;
- reading said input data at arithmetic logic unit (ALU) circuitry from said at least one first register;
- providing output data from said ALU circuitry to at least one second register;
- sending said output data from said at least one second register over said point-to-point streaming interface;
- reading another input data at another ALU circuitry from said at least one first register; and
- processing, by the other ALU circuitry, the other input data, wherein the other input data includes a branch instruction.

* * * * *